United States Patent [19]
Ogden

[11] 3,963,650

[45] June 15, 1976

[54] PROCESS FOR MAKING IMPROVED UREA/FORMALDEHYDE FOAMS

[75] Inventor: Dennis Henry Ogden, Penn, England

[73] Assignee: British Industrial Plastics Limited, Manchester, England

[22] Filed: Sept. 4, 1974

[21] Appl. No.: 503,530

Related U.S. Application Data

[63] Continuation-in-part of Ser. No. 280,164, Aug. 14, 1972, abandoned, which is a continuation of Ser. No. 52,789, July 7, 1970, abandoned.

[30] Foreign Application Priority Data

July 16, 1969 United Kingdom............... 36069/69

[52] U.S. Cl............................. 260/2.5 F; 23/252 R; 260/851
[51] Int. Cl.²............................................. C08J 9/00
[58] Field of Search................................. 260/2.5 F

[56] References Cited
UNITED STATES PATENTS

| | | | |
|---|---|---|---|
| 3,063,952 | 11/1962 | Vieli | 260/2.5 F |
| 3,150,108 | 9/1964 | Vieli | 260/2.5 F |
| 3,186,959 | 6/1965 | Shriver et al. | 260/2.5 F |
| 3,329,631 | 7/1967 | Pilgrim | 260/2.5 F |
| 3,377,139 | 4/1968 | MacGregor et al. | 260/2.5 F |
| 3,393,161 | 7/1968 | Avis et al. | 260/2.5 |

FOREIGN PATENTS OR APPLICATIONS

| | | | |
|---|---|---|---|
| 734,094 | 6/1940 | Germany | 260/2.5 F |

*Primary Examiner*—Richard B. Turer
*Attorney, Agent, or Firm*—Cushman, Darby & Cushman

[57] ABSTRACT

Improved low-density, self-sustaining urea/formaldehyde foams are prepared by separate foaming of an aqueous solution of a urea/formaldehyde resin and a foaming agent to form a first foam, and foaming an aqueous solution of a hardener and a foaming agent to form a second foam, and mixing the two foams in a liquid feed ratio of resin to hardener of at least 4:1 according to the disclosed process. The resin feed may be preheated prior to foaming. Using resins of high solids content produces foams of relatively low density.

14 Claims, 1 Drawing Figure

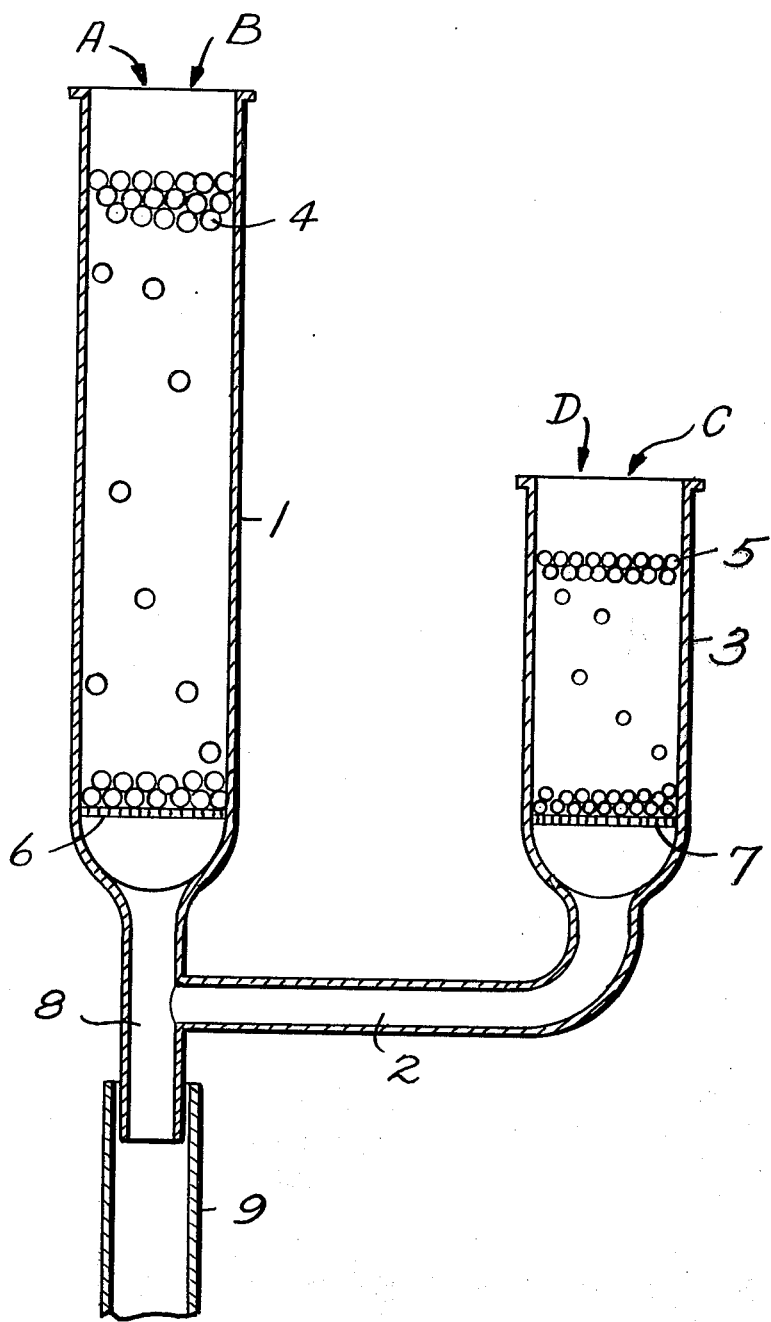

PROCESS FOR MAKING IMPROVED UREA/FORMALDEHYDE FOAMS

This application is a continuation-in-part of my earlier application Ser. No. 280,164 filed Aug. 14, 1972, now abandoned which in turn is a continuation of my application Ser. No. 52,789 filed July 7, 1970, now abandoned.

This invention relates to the production of foams from thermosetting resinous materials, essentially comprising urea/formaldehyde resins. Techniques hitherto commonly used for the production of such foams involve the use of an aqueous resin solution and an aqueous hardener solution, one component being foamed by the admixture of compressed air in the presence of a foaming agent, and after the foam has been produced the other component is mixed into the foam. In order to get a low density foam using this type of process, the use of large quantities of water is required, and these large quantities of water are costly to remove and weaken the eventual foam structure.

Thus, various attempts have been made to reduce the proportion of water required to make a foam of a particular density. One such attempt has involved the foaming of the resin solution, followed by the injection therein of a relatively small volume of hardener solution. However, this technique inevitably means that the hardener solution has a high acid concentration which causes the resin foam with which it comes into contact to cure very rapidly giving rise to mixing and dispersion problems. An object of the invention is to provide a method for producing foam at a given dry density from component formulations of thermosetting resinous materials at a higher overall solids content than could be provided by earlier processes. It is also an object of the invention to provide an apparatus for the production of such a foam.

According to the present invention, a method of producing continuously a low-density self-sustaining foam comprises foaming a mixture including an aqueous solution of a thermosetting material comprising a urea/formaldehyde resin and a foaming agent to produce a first foam, foaming a mixture including an aqueous solution of a hardener and a foaming agent to produce a second foam, and mixing the first foam with the second foam.

That is, contrary to prior processes, the present invention requires that both the resin and the hardener be individually foamed before they are mixed with each other.

The thermosetting resin may be a simple urea/formaldehyde resin or it may be modified by the incorporation of a minor proportion of components such, for example, as melamine/formaldehyde resins, phenol/formaldehyde resins, melamine, soluble polyamides, glycols, resorcinol, polyvinyl alcohol, starches and sugars. The modifying component may be condensed into the urea/formaldehyde resin or merely mixed therewith, and in the latter case may be an active substance or merely a non-reactive filler.

Suitable hardening agents for the urea/formaldehyde resins are well known in the art, particularly phosphoric acid, and are first foamed and mixed with the foamed resin in an amount such that curing of the resulting low-density foam is insured.

The choice of foaming agent does not constitute a feature of my invention, and any foaming agent normally used in urea/formaldehyde foam systems may be utilized. Examples of typical foaming agents are:

Nansa HS 80 (sodium alkyl benzene sulphonate); Nansa HS 85S (sodium dodecyl benzene sulphonate); Nansa SL 30 (modified sodium dodecyl benzene sulphonate); Nansa LES 42 (blend of sodium dodecyl benzene sulphonate, lauryl ether sulphate, magnesium xylene sulphonate and ethoxylated fatty acid alkylolamides); Cropol 60 (sodium sulphosuccinate); Teepol 514 (blend of alkyl benzene sulphonates and secondary alkyl sulphates); Belloid NW (sodium salt of sulphonated coal tar fraction).

The solids content of the aqueous urea/formaldehyde resin solution is variable depending upon the desired properties of the article to be produced. Generally resin solutions of less than about 40% concentration are used in the prior art, in order to produce practically useful homogeneous foams. The object of the present invention is to produce such foams, despite using resin solutions of concentrations in excess of 40%. Depending on the required properties of the foam to be produced, resin concentrations can be increased to as much as 75% and even higher.

If more concentrated resin solutions are used, a higher density foam is obtained on the resin side (first foam) and hence the overall density is increased, but the final density is affected by the ratio of resin to hardener liquid feeds and their relative expansions. Since one advantage of the present invention is to reduce water content, it is preferable to keep the hardener feed rate as low as possible, whereas excessive acid concentration would normally give rise to bad mixing by foaming both acid hardener and resin components before mixing it is possible to use resin-hardener ratios of 4:1 to 50:1 expressed in terms of the volume of the respective component solutions in the unfoamed, liquid state, according to the final dry foam density required and the solids content of the resin solution used. Thus, with 45% solids a 7:1 ratio can be used to give 8 kg/m$^3$ dry foam which is commonly described as a low density urea/formaldehyde foam. However, this could normally be achieved using 22% resin solids at a ratio of 1:1 which would greatly increase the overall water content. If denser foams are required using the same apparatus, they can be obtained by altering feed ratios and/or resin concentration or by altering the degree of expansion achieved in each foaming unit by changes in air feed pressures or the geometry of the unit construction.

In addition, the expansion of the liquids can be increased by preheating of the solutions in order to attain even lower dry solids densities from any specific given formulation and operating conditions. The increase in volume possible on foaming is strongly influenced by viscosity and heating reduces the viscosity, so enabling lower density foaming to be obtained at any given dry solids content.

Since the viscosity of the resin solution is normally much higher than that of the hardener, the effect of heating the resin is usually much greater than that of heating the hardener, and is particularly effective at very high solids content. Thus, when the solids content of the first foam is relatively low, that is at least about 40% and less than about 60%, and thus having low viscosity, heating has a minimal effect, although it may be used. When the solids content of the resin is increased to a value of at least about 60% but less than about 75%, heating is more effective and is therefore optionally preferred. When operating in the higher theoretical solids content ranges, for example at least about 75%, heating is strongly preferred, if not required, to obtain the necessary reduction in viscosity of the resin material. Foams produced in accordance with the process of the present invention would have a range of dry foam density of at least 14 to 72 kg/m$^3$.

Further, according to the present invention, apparatus for producing continuously a low-density self-sustaining foam comprises at least two foaming units arranged and adapted to feed a foam mixing unit, each foaming unit being provided with foam-inducing packing, a gas-feed inlet and a liquid-feed inlet, whereby in operation one foaming unit is fed with gas under pressure and an aqueous solution of a thermosetting resin and a foaming agent, the other foaming unit is fed with gas under pressure and an aqueous solution of a hardener and a foaming agent, and the foam thus produced in the two foaming units is fed to and mixed in the foam-mixing unit. In addition, the liquid-feed inlet of at least one of the foaming units can be provided with heat-exchange means whereby heat can be supplied to the liquid feed for the mixture being foamed. If desired, the geometry of the surface of the heat-exchange means may be modified in known manner to assist the mixing, for example, by the provision of surface irregularities such as dimples. In a modified apparatus described in British patent specification No. 1,340,913 the heat exchanger takes the form of a pipe provided with pairs of diametrically opposed crimps, successive pairs being staggered through 90°.

A single mixing unit may be fed by a plurality of foaming units substituted for one or both of the said foaming units.

The accompanying drawing shows in diagrammatic form an apparatus suitable for producing a self-sustaining low-density foam in accordance with the invention.

With reference to the drawing, a vertical column 1 is connected by a connecting piece 2 to a vertical column 3. Column 1 has a height of 3 ft. (90 cm.), an internal diameter of 1 inch (2.5 cm.) and is packed with glass beads 4 each having a diameter of 6 millimeters. Column 2 has a height of 1 ft. (30 cm.) and an internal diameter of ¾ inch (1.8 cm.) and is filled with glass beads 5 each of which has a diameter of 3 millimeters. The glass beads are retained in column 1 and 3 respectively by means of wire gauzes, 6, 7 respectively. Attached to an extension 8 of column 1 below the point at which it is connected with column 2, is a flexible pipe 9 which may be of any desired length. The pipe 9 used for the quoted Example 1 had a length of 30–40 ft. (circa. 10m.) and an internal diameter ¾ inch (1.8 cm.), but a pipe used for say the injection of foam as insulation in a cavity wall may have a length of say 4–9 ft. (1½–3m.).

In operation, a stream A comprising an aqueous solution of resin together with a foaming agent is fed into the top of column 1. The feed stream A may be pre-heated by passage through a heat-exchanger (not shown). A stream B of air under pressure is also passed into the top of column 1, and foams the resin plus foaming agent solution whilst the latter is trickling through the packing of glass beads.

A stream C comprising an aqueous solution of a hardener together with a foaming agent is fed to the top of column 3, and a stream D of air under pressure is also passed into the top of column 3, and foaming of the mixed hardener solution takes place as it trickles through the glass bead packing.

Resinous foam flows into the extension 8 of column 1, as does foamed hardener issuing from the bottom of column 3 and passing along connecting piece 2. The foamed resin and foamed hardener mix intimately as they pass through pipe 9, from the end of which the foamed material is directed to the site where it is required. Although the mixing of the foam mostly takes place in the extension 8 of column 1, a certain amount of further mixing may take place in pipe 9. The mixing unit thus comprises a plain pipe section reduced in cross-section compared with the total cross-section of the foaming units so as to increase flow speed and thus assist mixing.

To enable the invention to be better understood, it will now be described in further detail with reference to the following examples in which all parts and percentages are by weight.

EXAMPLE 1

Using the apparatus described above, a solution of a urea/formaldehyde resin at a solids content of 40% in water, the solution being pre-heated to a temperature of 50° C. and containing 1½% (on the weight of the resin solids) of the sodium dodecyl benzene sulphonate foaming agent known as Nansa HS was used as stream A at a rate of 4 liters per minute. Air stream B was supplied at 80 p.s.i. (6 kg/cm$^2$). Stream C comprising a 4% solution of phosphoric acid ($H_3PO_4$) at 20° C., and containing 1½% Nansa HS, was fed at a rate of 550 c.c. per minute, giving a feed ratio of 7.28:1. Air stream D was supplied at 40 p.s.i. (3 kg/cm$^2$). The density of the final foam was 0.875 lbs. per cubic foot (14 kg/m$^3$).

COMPARATIVE EXAMPLE

For comparison purposes, the same materials as used in Example 1 were used under the same conditions except that the resin solution alone was foamed in the manner used hitherto and the hardener added to the foam. The minimum final density that could be achieved was 2.1 lbs. per cubic foot (33 kg/m$^3$).

EXAMPLE 2

Apparatus similar to that described above but of different dimensions has also been used in our investigations. Column 1 had a height of 60 cm. and a internal diameter of 4 cm., the packing beads 4 each having a diameter of 5 mm. Both the feed stream A to column 1 and the feed stream C to column 3 were provided with heat exchangers. Column 1 was fed at a rate of 7 liters per minute with a solution of urea/formaldehyde resin at 60% solids content and containing 1% of the sodium dodecyl benzene sulphonate. This was heated a 35° C. Both columns were fed with air at 2 kg/cm$^2$. The product was an excellent foam, having a density of 104 kg/m$^3$ wet and 53 kg/m$^3$ air-dry.

EXAMPLE 3

Example 2 was repeated, except that a small portion of polyvinyl alcohol (88/10 Revinex) was substituted for part of the urea/formaldehyde resin at a level of 2% of the resin mix. This gave a foam having the same properties as that made in Example 2 except that it had improved compressive strength.

EXAMPLE 4

Example 2 was repeated, using the same apparatus and materials except that a resin solution of 64% solids content was used. Column 1 was fed with air at 1.65 kg/cm$^2$ and column 3 was fed with air at 2 kg/cm$^2$. The foam produced had a density of 112 kg/m$^3$ wet and 72 kg/m$^3$ air-dry.

EXAMPLES 5,6,7, and 8 were carried out in apparatus in which column 1 had a height of 60cm., an internal diameter of 4cm. and was packed with 8mm. glass beads; column 3 had a height of 60cm., an internal diameter of 2cm. and was packed with 5mm. glass beads and flexible tail pipe 9 was 4m. in length and 2.5cm. diameter. In the following Examples, resin containing 1½% NANSA HS (Calculated on resin solids) was fed to column 1 at a rate of 7 liters per minute and a solution containing 4% phosphoric acid and 1½% NANSA HS was fed to column 3. Whilst maintaining these conditions, the effect of varying temperature and feed ratio was demonstrated.

EXAMPLE 5

Resin of 75% solids content and 25°C was fed to column 1 with air at a pressure of 1.5 kg/cm$^2$; 1.7 liters per minute of the acid solution was fed to column 3 with air at the same pressure. A foam with an air-dry density of 50.7 kg/m$^3$ was produced.

EXAMPLE 6

Example 5 was repeated with the resin at 75°C and the air pressure on column 1 of 3.8 kg/cm$^2$. The air pressure on column 3 was 3.75 kg/cm$^2$. The foam then produced had an air-dry density of 25.2 kg/m$^3$.

EXAMPLE 7

Using the same resin solution as in Examples 5 and 6 with air at a pressure of 2.4 kg/cm$^2$ and feeding 1.4 liters per minute of acid solution to column 3 with air at a pressure of 3.23 kg/cm$^2$, foam with an air-dry density of 30.9 kg/m$^3$ was produced.

EXAMPLE 8

Example 7 was repeated feeding 1.17 liters per minutes of acid solution and air at a pressure of 2.25 kg/cm$^2$ to column 3. The foam so produced had an air-dry density of 41.3 kg/m$^3$.

What is claimed is:

1. A method of producing a low-density, self-sustaining urea/formaldehyde foam comprising foaming a mixture including an aqueous solution of thermosetting material comprising a urea/formaldehyde resin having a theoretical solids content of at least 40% and less than about 60% and a foaming agent to produce a first foam; foaming a mixture including an aqueous solution of a hardener for the resin and a foaming agent to form a second foam; and mixing the first foam with the second foam so that the liquid feed ratio of resin to hardener is from about 4:1 up to at most about 50:1.

2. A method according to claim 1, wherein the mixture forming the first foam is heated.

3. A method according to claim 2, wherein the mixture forming the second foam is also heated.

4. A method according to claim 1, wherein the resin is a simple urea/formaldehyde resin.

5. A method according to claim 1, wherein the resin is modified urea/formaldehyde resin.

6. A method of producing a low-density, high compressive strength self-sustaining urea/formaldehyde foam comprising optionally pre-heating then foaming a mixture including an aqueous solution of a thermosetting material comprising a urea/formaldehyde resin having a theoretical solids content of at least 60% and less than about 75% and a foaming agent to produce a first foam, foaming a mixture including aqueous solution of a hardener for the resin and a foaming agent to produce a second foam, and mixing the first foam with the second foam so that the liquid feed ratio of resin to hardener is from about 7:1 up to at most about 50:1.

7. A method according to claim 6, wherein the mixture forming the first foam is heated.

8. A method according to claim 7, wherein the mixture forming the second foam is also heated.

9. A method according to claim 6, wherein the resin is a simple urea/formaldehyde resin.

10. A method according to claim 6, wherein the resin is modified urea/formaldehyde resin.

11. A method of producing a low-density, high compressive stength sustaining urea/formaldehyde foam comprising heating then foaming a mixture including an aqueous solution of thermosetting material comprising a urea/formaldehyde resin having a theoretical solids content of at least 75% and a foaming agent to produce a first foam; foaming a mixture including an aqueous solution of a hardener for the resin and a foaming agent to form a second foam; and mixing the first foam with the second foam so that the liquid feed ratio of resin to hardener is from about 4:1 up to at most about 50:1.

12. A method according to claim 11, wherein the mixture forming the second foam is also heated.

13. A method according to claim 11, wherein the resin is a simple urea/formaldehyde resin.

14. A method according to claim 11, wherein the resin is modified urea/formaldehyde resin.

* * * * *